United States Patent [19]

Gosswiller

[11] 4,281,311
[45] Jul. 28, 1981

[54] METHOD AND APPARATUS FOR INCREASING EFFECTIVE LIGHT INTENSITY OF A ROTATING LIGHT

[75] Inventor: Earl W. Gosswiller, Clarendon Hills, Ill.

[73] Assignee: Federal Signal Corporation, Oak Brook, Ill.

[21] Appl. No.: 46,173

[22] Filed: Jun. 7, 1979

[51] Int. Cl.³ .......................... B60Q 1/46; H02P 5/08
[52] U.S. Cl. .................................... 340/81 R; 340/50;
340/84; 340/87; 362/35; 362/170; 318/359;
350/99
[58] Field of Search .................. 340/81 R, 50, 87, 98,
340/84, 366 D; 350/288, 97, 99, 100, 101, 107,
289, 307, 285, 280; 362/170, 35, 255, 43, 269,
69, 171–173, 174, 219; 318/349, 358, 359, 514,
515, 516

[56] References Cited

U.S. PATENT DOCUMENTS

| | | | |
|---|---|---|---|
| 1,100,748 | 6/1914 | Laycock | 318/359 |
| 1,442,543 | 1/1923 | Schuler | 362/35 |
| 1,561,266 | 11/1925 | Menzies | 318/359 |
| 2,008,408 | 7/1935 | Thompson | 362/35 |
| 2,096,755 | 10/1937 | Parsberg | 362/35 |
| 3,133,263 | 5/1964 | Norberg | 340/50 |

Primary Examiner—John W. Caldwell, Sr.
Assistant Examiner—Donnie L. Crosland
Attorney, Agent, or Firm—Charles F. Pigott, Jr.

[57] ABSTRACT

A rotating signal light for use on police cars, ambulances and other vehicles on which a warning light is required, the light being driven at a non-uniform speed of rotation for the purpose of enhancing light intensity in certain predetermined directions and reducing light intensity in other directions.

1 Claim, 9 Drawing Figures

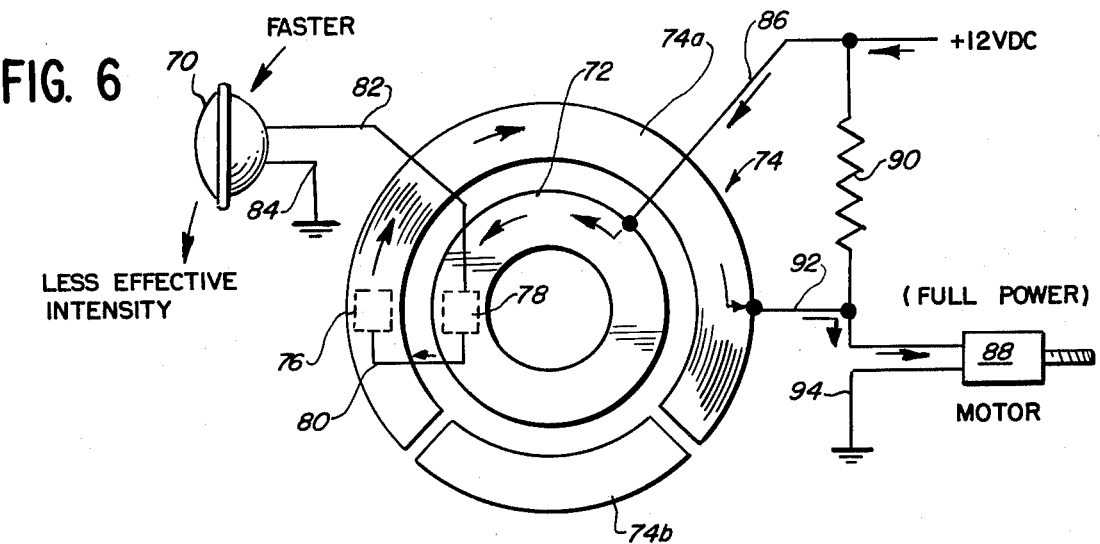
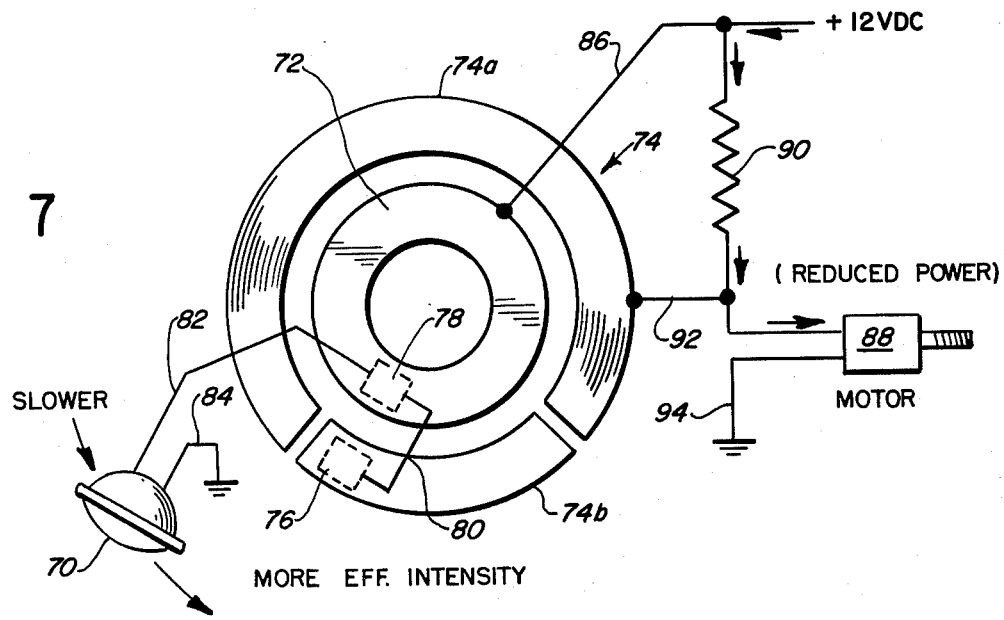

METHOD AND APPARATUS FOR INCREASING EFFECTIVE LIGHT INTENSITY OF A ROTATING LIGHT

BRIEF SUMMARY OF THE INVENTION

The present invention relates to a rotating signal light or warning light for use on various types of emergency and other vehicles, such as police cars and ambulances, and in particular to a light which is rotated at a non-uniform speed.

It is well known to utilize a rotating light as a warning light for mounting on the top of emergency and other vehicles. Such lights conventionally are rotated at a constant speed, and they produce a predetermined number of flashes per minute in accordance with such speed. Thus, if a single reflector lamp is rotated at a speed of 60 revolutions per minute, it will produce in any given direction light flashes at a rate of 60 flashes per minute.

Rotating warning lights of the foregoing type utilize standard incandescent bulbs, or halogen bulbs which also have come into common use. While halogen lamps can provide somewhat more light intensity for a given electrical power than conventional incandescent lights, there are applications requiring high light intensities in the front and/or rear directions and limited power drain which cannot be met by conventional rotating lights utilizing either incandescent lights or halogen lights.

The present invention is based on the known concept that the effective intensity of a flashing light depends upon the instantaneous intensity of the light beam and the length of time it stimulates the eye of the observer. Thus, the greater the speed of rotation of a rotating light, the less time it has to stimulate the eye of an observer as the light passes by, and thus the less the effective intensity of a given light flash.

It will be understood from the foregoing that it is possible to increase the flash intensity of a rotating light by reducing the constant speed of rotation of the light. However, in many applications, it is as important to maintain a given flash rate as it is to maintain a minimum flash intensity. Accordingly a system which produces greater flash intensity, but only by reducing the flash rate, is not an improvement over conventional warning lights. Similarly, one can increase light intensity by increasing the electrical power supplied to a light, or using more than one bulb. However, here again it is often as important to maintain low amperage requirements for a light system as it is to provide high intensity. For example, certain U.S. Government specifications for lighting systems set relatively high minimum intensity requirements in the front and rear directions and a minimum flash rate, and also set relatively low amperage requirements which must not be exceeded by a complete lighting system.

It is therefore a general object of the present invention to provide a rotating warning light which is rotated at a non-uniform speed to increase the effective intensity of the light flashes in certain predetermined directions where the speed of rotation is relatively low.

The foregoing and other objects and advantages of the invention will be apparent from the following description of a preferred embodiment, taken in conjunction with the accompanying drawings.

DESCRIPTION OF THE DRAWINGS

FIG. 6 is a schematic wiring diagram illustrating an alternative embodiment of the invention where speed of rotation of a rotating light is controlled electrically by effecting non-uniform drive motor speed through variation of the power supply to the motor;

FIG. 7 is a further schematic wiring diagram of the embodiment of FIG. 6 illustrating a different rotational position of the light wherein speed of rotation is reduced and effective light intensity increased;

Now, in order to acquaint those skilled in the art with the manner of making and using my invention, I shall describe, in conjunction with the accompanying drawings, certain preferred embodiments of the invention.

DETAILED DESCRIPTION OF THE INVENTION

Figure 1:
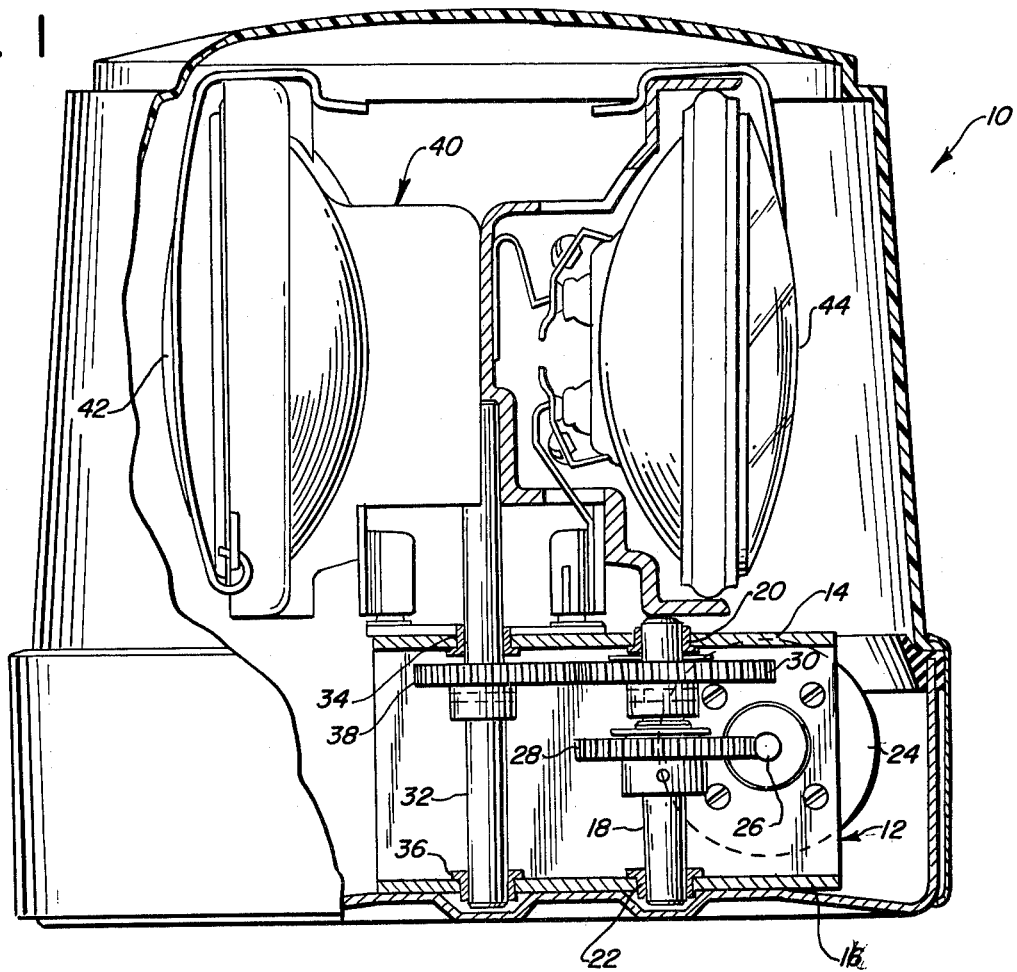
FIG. 1 is a vertical sectional view of one embodiment of the invention comprising a rotating light driven at a non-uniform speed by a drive system including non-circular gears.

Referring now to the drawings, FIG. 1 illustrates a rotating light assembly 10 including a mounting plate 12 having an upper mounting plate portion 14 and a lower mounting plate portion 16. A gear shaft 18 has its upper end journalled in a bushing 20 in the upper plate 14, and its lower end journalled in a bushing 22 in the lower plate 16.

A constant speed motor 24 drives a worm 26 which in turn drives a gear 28 at a constant speed, the gear 28 being fixedly mounted on the shaft 18 for rotation therewith. A non-circular gear 30 is also fixedly mounted on the gear shaft 18 for conjoint rotation with the gear 28.

A second shaft 32 is rotatably journalled in bushings 34 and 36 mounted in the upper and lower mounting plate members 14 and 16. A second non-circular gear 38 is fixedly mounted on shaft 32 for rotation therewith, the gear 38 being complementary to the non-circular gear 30 and in operative engagement therewith.

A light assembly 40 is mounted on the upper end of the shaft 32 for rotation therewith. In the embodiment being described, the light assembly includes two lamps 42 and 44 mounted in back-to-back relation to face in opposite directions. In accordance with the present invention, a single lamp may be used, or a pair of back-to-back lamps as shown, and in the latter embodiment, the lamps may be similar, or one may be a white lamp and the other a different color such as red. The lamps may be of the incandescent type, or of the halogen type.

Figure 2:
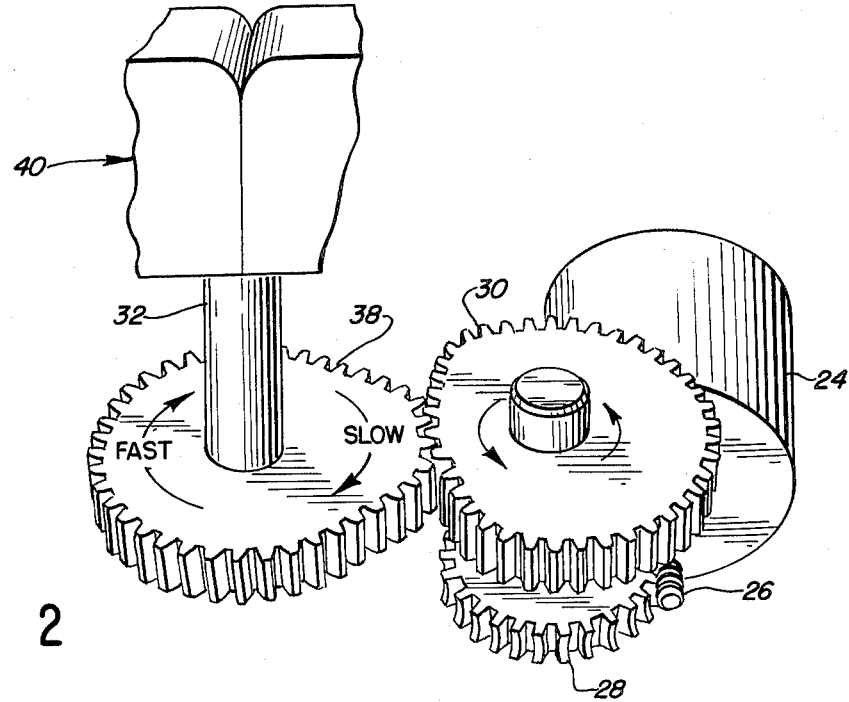
FIG. 2 is an enlarged fragmentary perspective view of the non-circular gear drive of FIG. 1.

FIG. 2 illustrates the non-circular gears 30 and 38 more clearly. The purpose of the non-circular gears is to achieve a non-uniform rotational speed for the light assembly. The non-circular gears are complementary, and it will be seen that in the position shown in FIG. 2, a segment of the driving gear 30 of reduced radius is engaged with a segment of the driven gear 38 of increased radius. Accordingly, the effect is that of a smaller gear driving a larger gear, and the result is a reduction in the speed of rotation of the light assembly 40, having in mind motor 24 drives worm gear 28 at a constant speed. In a similar manner, when a segment of the driving gear 30 of increased radius is engaged with a segment of the driven gear 38 of reduced radius, the effect will be as in the case of a larger gear driving a smaller gear, and the result will be an increase in the speed of rotation of the light assembly 40.

Various types of non-circular gears may be utilized in accordance with the foregoing embodiment. Such gears are manufactured by Cunningham Industries, Inc. of Stamford, Conn., and published literature is available from the foregoing company. Such gears afford one type of mechanical means for varying the speed of rotation of a rotating light in order to vary the effective intensity of the light and thereby enhance the intensity in certain selected directions.

Figure 3:
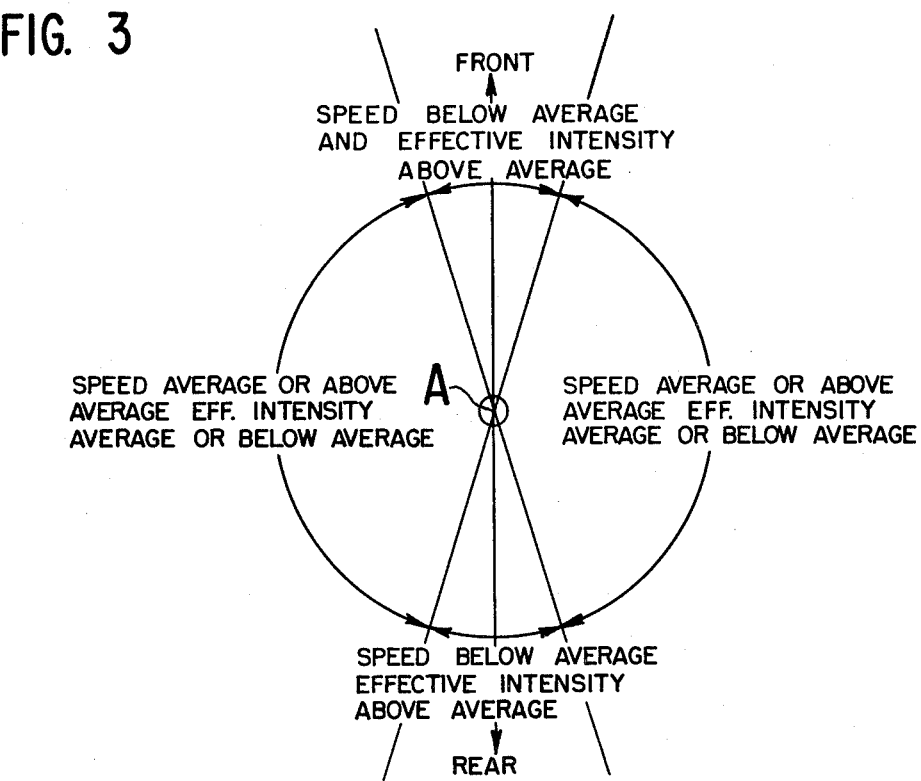
FIG. 3 is a diagrammatic top plan representation of a rotating light, illustrating reduced speed of rotation and increased effective light intensity when the light is aimed generally forwardly or rearwardly within a predetermined arcuate segment.
Figure 4:
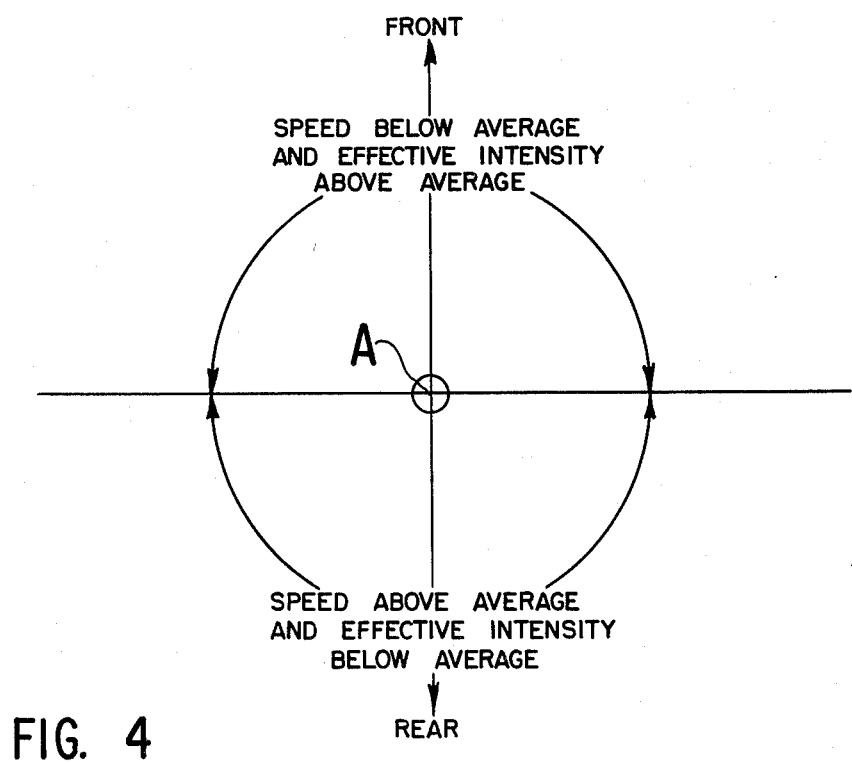
FIG. 4 is a further diagrammatic top plan representation of an alternative arrangement where the speed of rotation is reduced during a selected 180 degree arc of each revolution of the light, and is increased during the remaining 180 degree arc of one complete revolution.

FIGS. 3 and 4 illustrate one particular application of the present invention. FIG. 3 is a top plan schematic illustration of a light which rotates 360 degrees about an axis A. In accordance with the illustration, there is shown an area labeled "Front" which comprises an arcuate segment of approximately 30 degrees, and there is shown an oppositely disposed area labeled "Rear" which also comprises an arcuate segment of approximately 30 degrees.

In accordance with the foregoing application of the invention, the speed of the rotating light may be reduced during the time the light is aimed in a direction included in the "Front" segment, and also when the light is aimed in a direction included in the "Rear" segment. In the remaining arcuate segments of one complete revolution, which in FIG. 3 comprise a total of approximately 300 degrees, the speed of rotation may be increased.

In accordance with the foregoing embodiment, which by way of example may represent a rotating light mounted on the top of a police car or ambulance, the intensity of the light will be enhanced in the forward and rearward directions, and will be reduced at the sides. Thus, enhancement of light intensity at the front and rear can be achieved without reducing the flash rate, and without increasing the amperage required to power the light.

It will of course be understood that in certain applications of a warning light mounted on the top of an emergency or other vehicle, it is more important to provide maximum light intensity forwardly and rearwardly of the vehicle, and less important to provide such intensity to the sides of the vehicle. Therefore, the present invention is well adapted to provide the greatest effective light intensity in those selected areas where it is most needed.

FIG. 4 illustrates a variation of the application of FIG. 3. In the embodiment of FIG. 4, one complete revolution is divided into two 180 degree segments. In one such 180 degree segment indicated as the "Front", speed of light rotation is maintained at a reduced rate to increase effective intensity of the light flash, and in the remaining 180 degree segment, speed is maintained at an increased rate to reduce the effective light flash intensity. This embodiment is useful in applications where a rotating light is needed primarily for providing illumination in a forward direction only, or in a rearward direction only. One example would be where a plurality of rotating lights are mounted on a vehicle, and certain of the lights are utilized to provide forwardly directed light flashes only, while other lights are utilized to provide rearwardly directed light flashes only.

Figure 5:
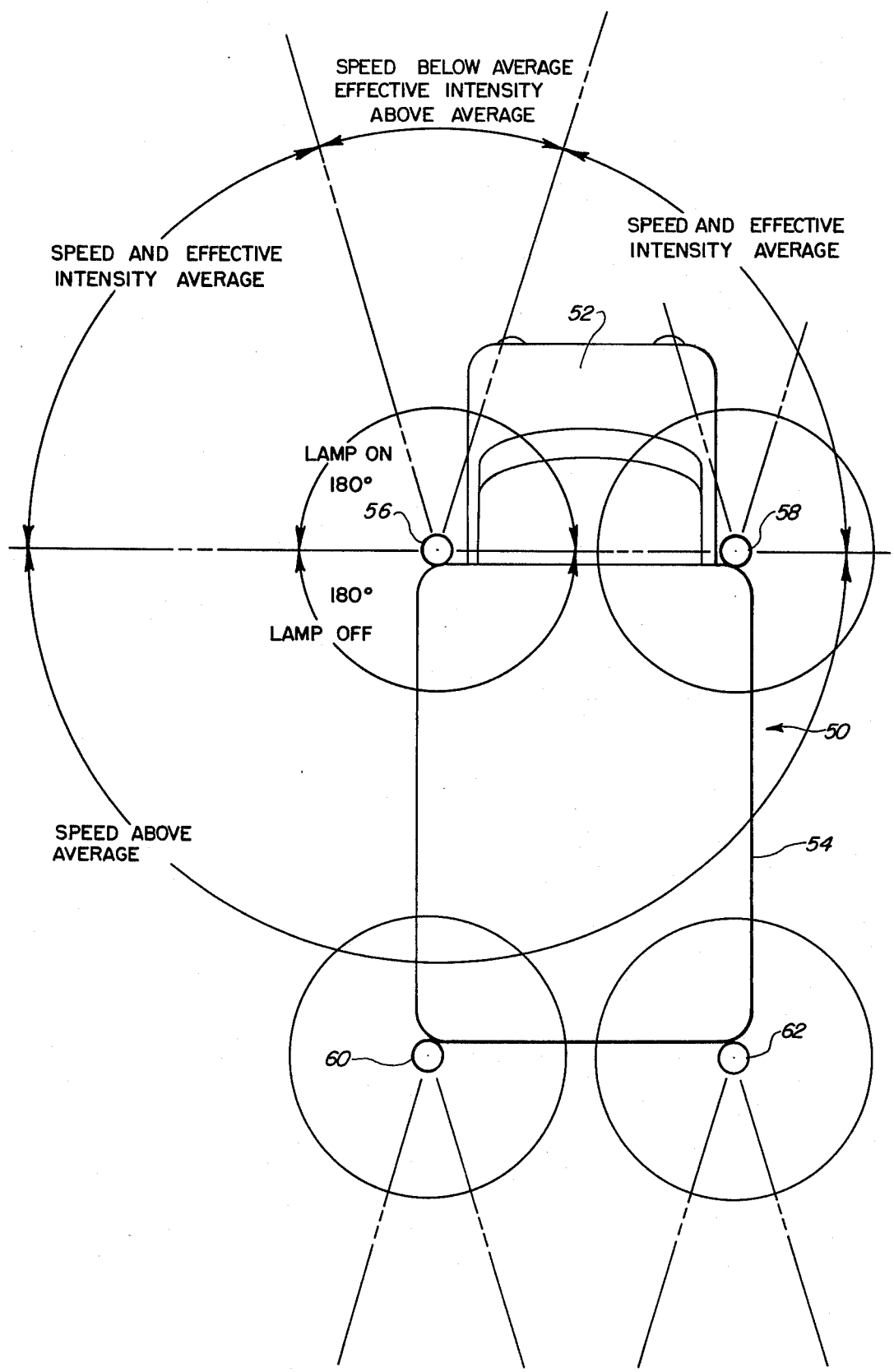
FIG. 5 is a further diagrammatic top plan representation of an ambulance equipped with four warning lights, in conjunction with a representation of the relative speed and light intensity of the lights during various segments of a complete 360 degree revolution.

FIG. 5 is a diagrammatic top plan view of an ambulance or like vehicle 50 having a cab portion 52 and body portion 54. In the embodiment illustrated, there are four rotating warning lights mounted at the four corners of the body portion 54. Thus, light 56 is mounted at the front left corner, light 58 is mounted at the front right corner, light 60 is mounted at the rear corner, and light 62 is mounted at the rear right corner.

In accordance with the particular embodiment illustrated in FIG. 5, it is intended each of the four lights is "on" only during 180 degrees of each revolution, and "off" during the remaining 180 degrees. Thus, each of the front lights 56 and 58 are turned "on" when aimed in the forward 180 degree segment, and "off" during the other half of each complete revolution. In a similar manner, each of the rear lights 60 and 62 will be turned "on" only when aimed in the rearward 180 degree segment, and "off" during the other half of each complete revolution. Thus, where a plurality of rotating lights are mounted on a relatively large vehicle body, it may be desirable to rely upon certain lights for forward flashing signals and other lights for rearward flashing signals.

Referring in particular to the light 56 shown in FIG. 5, it will be seen from the diagrammatic illustration that when the light is aimed in a direction within a forward arcuate segment of approximately 30 degrees, the speed of rotation is reduced to provide increased effective light flash intensity, such reduced speed being labeled "above average". During the remaining portion of the forward 180 degree segment of one complete revolution, when the light is "on", speed of rotation is increased relative to that in the front-facing 30 degree segment, and the speed is indicated as "average" thereby producing "average" light intensity which is less than that produced when the light is aimed in the front 30 degree segment. When the light 56 is aimed in a direction within the rear 180 degree segment of its 360 degree revolution, and in its "off" mode, speed is increased to "above average", i.e., the highest of three different rates of speed.

The highest rate of rotational speed is provided during that segment of the complete revolution when the light 56 is "off", since light intensity is zero, and there is no reason not to rotate the light through such an "off" segment at relatively high speed. The intermediate speed is provided when the light is "on", but not aimed in the forward-facing 30 degree segment which is of greatest importance, thereby producing reduced or "average" flash intensity. The minimum rotational speed is provided when the light is aimed in the forward-facing 30 degree segment, in order to provide maximum effective light flash intensity in that direction.

FIGS. 6 and 7 illustrate a further embodiment of the invention where variation in speed of a rotating light is effected by electrical rather than mechanical means.

Thus, in this embodiment, speed of rotation is controlled by varying the power supplied to the drive motor. Referring to FIG. 6, there is shown in diagrammatic form a rotatable lamp 70, an inner collector ring 72, an outer collector ring 74, a pair of brushes or contacts 76 and 78 connected to each other through line 80 and to the lamp through line 82. The lamp 70 is further connected to ground through line 84.

The outer collector ring 74 is divided into two segments 74a and 74b, and in the embodiment shown the segment 74a constitutes approximately 270 degrees of one complete revolution, while the segment 74b constitutes approximately 90 degrees. The motor circuit is illustrated as comprising a 12 VDC source connected to the inner collector ring 72 through line 86 and connected to motor 88 through resistance 90. The outer collector ring segment 74a is connected to motor 88 through line 92, whereas segment 74b is open, and motor 88 is connected to ground through line 94.

When light 70 rotates, brushes 76 and 78 move with the light in an arcuate path around the stationary collector rings 72 and 74. When lamp 70 is in the approximately 270 degree segment where outer brush 76 is in contact with the outer collector ring segment 74a, as illustrated in FIG. 6, power from the 12 volt DC source is transmitted through line 86, inner collector ring 72, line 80, outer collector ring segment 74a and line 92 to motor 88, thereby shorting out resistance 90 and supplying full power to the motor. When lamp 70 is in the approximately 90 degree segment where outer brush 76 is in contact with outer collector ring segment 74b, as illustrated in FIG. 6A, the foregoing circuit is shorted by the open ring segment 74b, and thus current to the motor passes through resistance 90 thereby reducing motor speed.

In the foregoing manner, a segmented collector ring is utilized to short out resistance 90 from the motor circuit during a portion of the revolution of lamp 70, thereby varying motor speed and as a result effecting a variation in effective light flash intensity. In the embodiment of FIGS. 6 and 7, maximum effective light intensity will be achieved during the time current to motor 88 is reduced by resistance 90, i.e., in the approximately 90 degree segment that brush 76 is in contact with open ring segment 74b.

Figure 9:
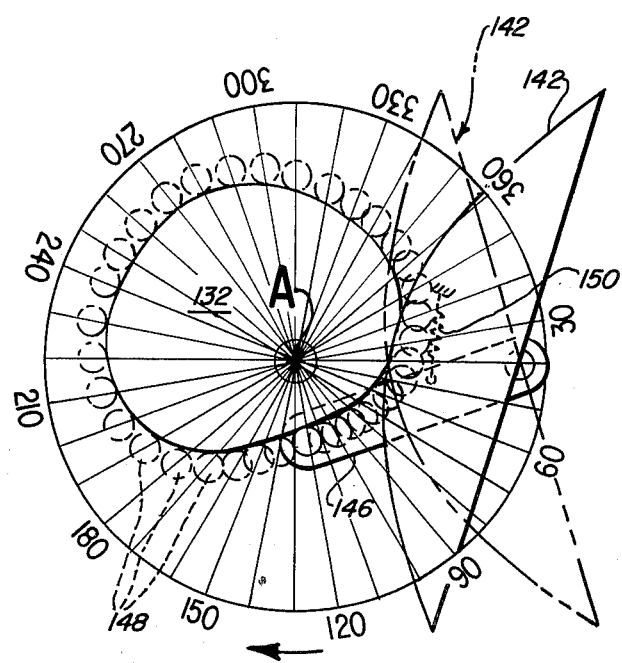
FIG. 9 is a fragmentary sectional view taken substantially along the line 9—9 of FIG. 8.
Figure 8:
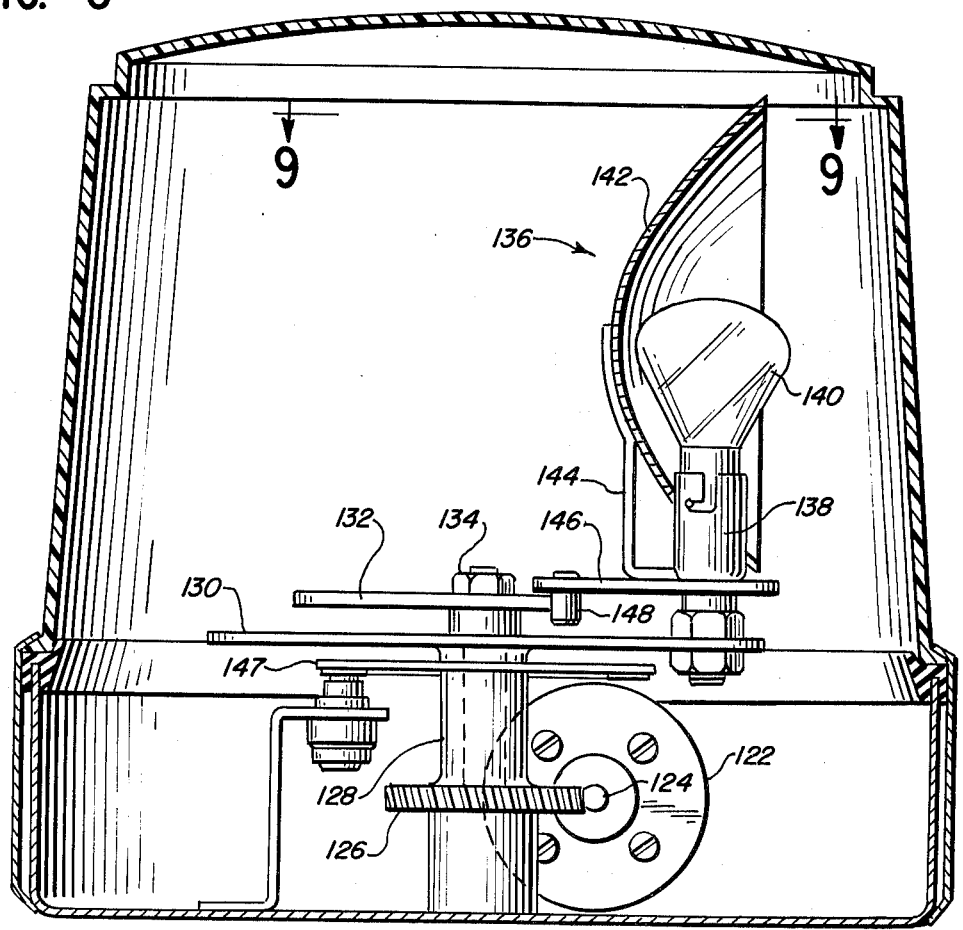
FIG. 8 is a vertical sectional view of still another embodiment of the invention where a light reflector is pivotally mounted on a rotating platform and is pivoted relative to the platform to vary the effective intensity of the light.

FIGS. 8 and 9 illustrate a further embodiment of mechanical drive mechanism for varying the speed of rotation of a lamp member. FIG. 8 shows a drive motor 122, worm 124 and worm gear 126, the worm gear 126 being integral with a sleeve 128 which is also integral with a rotatable platform 130. A cam 132 is fixedly mounted above rotatable platform 130 and secured in position by nut 134. A light assembly 136 includes lamp socket 138, lamp 140, and pivotally mounted lamp reflector 142 having a support 144 welded or otherwise secured to drive arm 146. A collector ring 147 is provided to supply power to the rotating light.

Drive arm 146 pivots reflector 142 about the vertical lamp axis, and such movement is controlled by stationary cam 132. A cam follower 148 is carried by drive arm 146 and is held in engagement with the cam 132 by a tension spring 150 (see FIG. 9). Accordingly, as lamp platform 130 is rotated, lamp 140 is moved through a complete revolution, and cam follower 148 rides around the periphery of fixed cam 132 as shown in FIG. 9, thereby effecting pivotal movement of reflector 142 relative to the rotating platform 130.

Referring to FIG. 9, if it be assumed platform 130 is rotating in a clockwise direction about a vertical axis indicated at A, as cam follower 148 rides over a portion of cam 132 which is decreasing in radius, reflector 142 will be pivoted in a clockwise direction about the axis of lamp 140, as for example from the position shown in dash lines in FIG. 9 to the position shown in solid lines. On the other hand, when cam follower 148 rides over a portion of cam 132 which is increasing in radius, reflector 142 will be pivoted in a counterclockwise direction relative to the platform 130, as for example from the position shown in solid lines in FIG. 9 to the position shown in dash lines therein.

When the pivotal movement of the reflector 142 is in the same direction as the direction of rotation of the platform, e.g., when both are clockwise, the result is an increase in the effective rate of rotation of the lamp 140 about axis A. On the other hand, when pivotal movement of reflector 142 is opposite to the direction of rotation of platform 130, e.g., one is clockwise and one is counterclockwise, the result is a decrease in the effective rate of rotation of lamp 140 about axis A.

It will now be understood that if platform 130 is rotating in a clockwise direction as viewed in FIG. 9, and the portion of cam 132 in engagement with cam follower 146 is decreasing in radius, the result is an effective increase in the rotational speed of the lamp 140 and a decrease in effective light flash intensity. When platform 130 is rotating in a clockwise direction, and the portion of cam 132 in engagement with cam follower 148 is increasing in radius, the result is an effective decrease in the rotational speed of the lamp, and an increase in the effective light flash intensity. In other words, pivotal movement of reflector 142 in one direction tends to speed up movement of the lamp past the eye of an observer, while pivotal movement in the other direction slows down such movement and increases effective light intensity.

Various types of mechanical and electrical means may be utilized in accordance with the present invention to vary rotational speed of a rotating signal light and in that manner control its effective intensity so that the greatest intensity will be achieved when the light is aimed in certain selected directions where it is desired to provide above average light intensity.

The electrical embodiment, as described in FIGS. 6 and 7, is well adapted for use with the present invention if it is deemed sufficient to have only two different rates of speed of lamp rotation to achieve two different effective light intensities during one complete revolution of a rotating light. However, if a multitude of different speeds is desired to achieve several different light intensities during one complete revolution, the mechanical embodiments of FIGS. 1 and 2, and FIGS. 8 and 9, permit greater control over the rate of rotation of the light, which can be varied continuously if desired.

The present invention may be utilized either in conjunction with individual rotating lights as shown in FIG. 8, or in conjunction with light assemblies as shown in FIG. 1 where a pair of lamps are mounted back-to-back. In the latter case, the lamps may be "on" at the same time, or they may be connected so one is "off" while the other is "on".

Each of the several embodiments described herein affords the advantage that it permits a designer to meet higher flash intensity requirements without losing the ability to achieve a wide angle of coverage, 360 degrees where desired, as provided by ordinary rotating signal lights. Furthermore, the invention permits attainment of such higher intensity requirements without reduction of flash rate, and without increasing the electrical load imposed on a vehicle battery.

It should be understood that when the terms "rotatable" or "rotating" or like terms are used herein or in the appended claims in conjunction with a warning light or signal light, such terms include lights which produce a rotating beam, whether the lamp per se and an associated reflector or lens rotate conjointly as a unit as in the embodiment of FIG. 1, or a reflector or lens rotates about a stationary lamp, or a lamp moves and a reflector or lens also rotates about the lamp as in the embodiment of FIG. 8, since all such arrangements provide a rotating light beam which produces light flashes in a plurality of directions.

It should further be understood that where the term "reflector" is used herein or in the appended claims in conjunction with a rotating reflector to produce light flashes in different directions, such term is used broadly so as to include an embodiment where a lens rotates rather than a reflector, since a light beam may be aimed in different directions by rotating either an associated reflector or a lens which will direct a light beam in accordance with the position of the reflector or lens.

What is claimed is:

1. A rotatable signal light assembly comprising, in combination, a lamp mounted for rotation for producing light flashes in a plurality of different directions during a complete revolution of the lamp, and drive means for rotating said lamp at a non-uniform rate of speed which changes at least twice during said complete revolution to produce at least two different rates of speed during said revolution, said drive means including means effecting a reduced rate of motion when said lamp is aimed in a predetermined direction where it is desired to provide a light flash of increased intensity, said drive means including a variable speed drive motor, and means for varying the speed of said motor during a complete revolution of said lamp by varying the electrical power supplied to said motor, said means for varying the electrical power supplied to said motor comprising segmented collector ring means providing at least two alternate circuits between an electrical power source and said electric motor, each of said alternate circuits being operative during a selected respective portion of one complete revolution of said lamp.

* * * * *